(12) United States Patent
Ruiz

(10) Patent No.: US 8,270,115 B2
(45) Date of Patent: Sep. 18, 2012

(54) ASYMMETRICAL AIR BEARING SURFACE FOR A HEAD SLIDER IN HARD DISK DRIVES

(75) Inventor: Oscar J. Ruiz, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 617 days.

(21) Appl. No.: 12/474,164

(22) Filed: May 28, 2009

(65) Prior Publication Data

US 2010/0302684 A1 Dec. 2, 2010

(51) Int. Cl.
*G11B 5/60* (2006.01)
(52) U.S. Cl. .................. 360/235.2; 360/235.4
(58) Field of Classification Search .............. 360/235.2, 360/235.4
See application file for complete search history.

(56) References Cited

U.S. PATENT DOCUMENTS

| | | | |
|---|---|---|---|
| 6,004,472 A | 12/1999 | Dorius et al. | |
| 6,055,128 A | 4/2000 | Dorius et al. | |
| 6,055,129 A * | 4/2000 | Park et al. | 360/236.1 |
| 6,212,032 B1 * | 4/2001 | Park et al. | 360/234.7 |
| 6,356,412 B1 | 3/2002 | Levi et al. | |
| 6,445,542 B1 | 9/2002 | Levi et al. | |
| 6,477,013 B1 | 11/2002 | Kang et al. | |
| 6,583,961 B2 | 6/2003 | Levi et al. | |
| 6,590,746 B2 | 7/2003 | Kang et al. | |
| 6,674,611 B2 | 1/2004 | Bolasna et al. | |
| 6,771,468 B1 | 8/2004 | Levi et al. | |
| 7,085,103 B2 | 8/2006 | Kohira et al. | |
| 7,116,521 B2 | 10/2006 | Kameyama | |
| 7,218,478 B2 | 5/2007 | Mate et al. | |
| 7,251,107 B2 | 7/2007 | Huang | |

OTHER PUBLICATIONS

Bo Liu, Mingsheng Zhang, Shengkai Yu, L. Gonzaga, Yuet Sim Hor and Jianfeng Xu, Femto Slider: Fabrication and Evaluation, IEEE Transactions on Magnetics, vol. 39, Issue 2, Part 1, Mar. 2003, pp. 909-914.
Lee Dorius, S. Bolasna, J. Kotla, R. Simmons, Y. Iihara, T. Matsumoto, A. Tobari, H. Tsuchida, Introduction of Femto Slider in Mobile Disk Drives, IEEE Transactions on Magnetics, vol. 40, Issue 1, Jan. 2004, pp. 349-352.
John Best et al., The Femto Slider in Hitachi Hard Disk Drives, Hitachi Global Storage Technologies White Paper, available at http://www.hitachigst.com/tech/techlib.nsf/techdocs/AE7AEDB327B2E21186256D330078799B/$file/Femto_white_paper_FINAL_082505.pdf, Aug. 25, 2005.

* cited by examiner

*Primary Examiner* — Jami M Valentine
(74) *Attorney, Agent, or Firm* — Patterson & Sheridan, LLP

(57) ABSTRACT

A method and apparatus for a head slider air bearing surface (ABS) in hard disk drives that mitigate fly height deviations. The invention mitigates these problems by providing an ABS of the head slider with elongated asymmetrical features that extend substantially parallel to the direction of the airflow caused by the rotating magnetic disk, in one or both of the inner diameter (ID) and outer diameter (OD) positions of the head slider with respect to the magnetic disk. The head slider may be produced with a two step etch process, as opposed to a three step etch process. By reducing the number of etching steps, the head slider of the invention can be produced at lower costs and in less time as fewer masks and chamber pump-down steps are required.

21 Claims, 5 Drawing Sheets

ASYMMETRICAL AIR BEARING SURFACE FOR A HEAD SLIDER IN HARD DISK DRIVES

BACKGROUND OF THE INVENTION

1. Field of the Invention

Embodiments of the invention generally relate to a head slider within disk drive data storage devices.

2. Description of the Related Art

In an electronic data storage and retrieval system, a magnetic head typically includes a read/write transducer for retrieving and storing magnetically encoded information on a magnetic recording medium or disk. A suspended head slider supports the magnetic head. In operation, the head slider rides on a cushion or bearing of air above the surface of the disk as the disk is rotating at its operating speed. The head slider includes an air bearing surface (ABS) designed to generate an air bearing force that counteracts a preload bias urging the head slider toward the disk. The head slider flies above and out of contact with the disk as a result of the air bearing force.

SUMMARY OF THE INVENTION

The present invention, in a first embodiment is a head slider for a hard disk drive. The head slider includes a leading edge, a trailing edge, first and second side edges extending between the leading edge and the trailing edge and an air bearing surface (ABS). The ABS includes a trailing pad adjacent the trailing edge of the head slider, a first arm having a first end connected to the trailing pad, the first arm extending from the trailing pad toward the leading edge of the head slider and including a first extended linear portion oriented substantially parallel to an airflow direction when the head slider is positioned at an inner diameter (ID) position relative to a spinning magnetic disk; and a second arm having a first end connected to the trailing pad, the second arm extending from the trailing pad toward the leading edge of the head slider and including a second extended linear portion oriented substantially parallel to an airflow direction when the head slider is positioned at an outer diameter (OD) position relative to the spinning magnetic disk. The entire second extended linear portion and at least part of the first extended linear portion are located on a same side of a center line of the ABS In a further embodiment, the invention is a hard disk drive. The hard disk drive including a magnetic disk with a surface, the magnetic disc creating an airflow in a direction substantially tangential to the magnetic disk, when the disk is spinning and an actuator arm designed and configured to support a head slider over the disk surface at an inner diameter (ID) position, an outer diameter (OD) position and positions in between the ID and OD positions. The head slider includes a leading edge, a trailing edge, first and second side edges extending between the leading edge and the trailing edge and an air bearing surface (ABS). The ABS includes a trailing pad adjacent the trailing edge of the head slider, a first arm having a first end connected to the trailing pad, the first arm extending from the trailing pad toward the leading edge of the head slider and including a first extended linear portion oriented substantially parallel to an airflow direction when the head slider is positioned at an inner diameter (ID) position relative to a spinning magnetic disk; and a second arm having a first end connected to the trailing pad, the second arm extending from the trailing pad toward the leading edge of the head slider and including a second extended linear portion oriented substantially parallel to an airflow direction when the head slider is positioned at an outer diameter (OD) position relative to the spinning magnetic disk. The entire second extended linear portion and at least part of the first extended linear portion are located on a same side of a center line of the ABS.

In another embodiment, the invention is a method of forming an air bearing surface (ABS) of a head slider for use in a hard disk drive. The method includes providing a head slider having a leading edge, a trailing edge and first and second side edges, conducting a first selective etch process on the head slider to form first and intermediate features at a first etch depth; and conducting a second selective etch process on the head slider to form second features at a second etch depth, and to form third features at a third etch depth by subjecting the intermediate features formed by the first selective etch process to the second selective etch process. The first and second selective etch processes form a trailing pad adjacent the trailing edge of the head slider, a first arm having a first end connected to the trailing pad, the first arm extending from the trailing pad toward the leading edge of the head slider and including a first extended linear portion oriented substantially parallel to an airflow direction when the head slider is positioned at an inner diameter (ID) position relative to a spinning magnetic disk; and a second arm having a first end connected to the trailing pad, the second arm extending from the trailing pad toward the leading edge of the head slider and including a second extended linear portion oriented substantially parallel to an airflow direction when the head slider is positioned at an outer diameter (OD) position relative to the spinning magnetic disk. The entire second extended linear portion and at least part of the first extended linear portion are located on a same side of a center line of the ABS.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
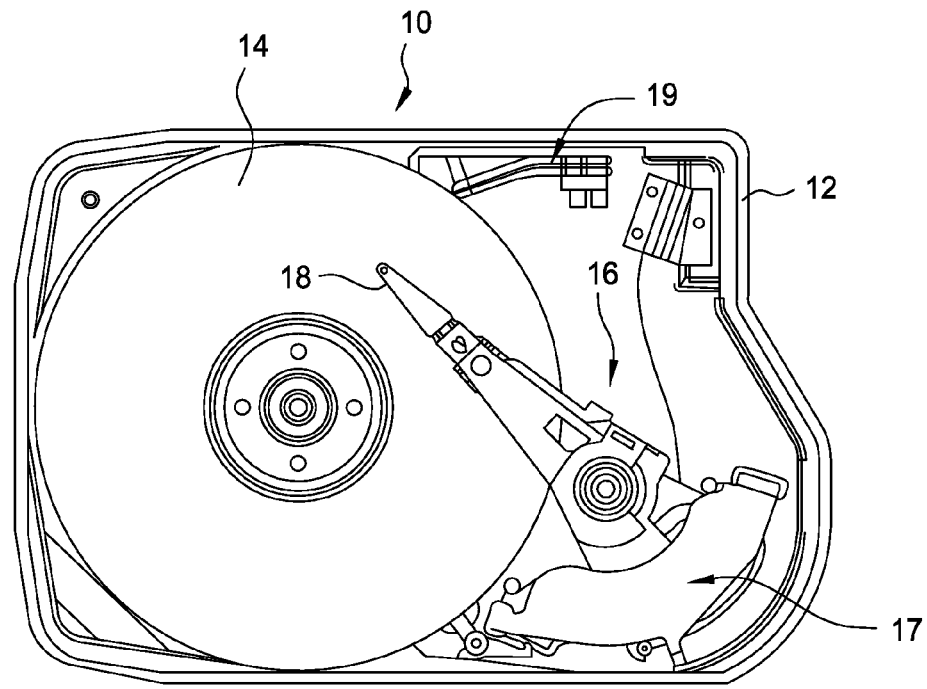
FIG. 1 shows an exemplary disk drive having a magnetic disk, and a head slider mounted on an actuator, according to embodiments of the invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention relate to the control of a head slider's fly height over a magnetic disk in a hard disk drive. Several problems with prior art head sliders are encountered that affect fly height negatively. Some of these include: lubricant pick-up; high peak pressure between the head slider and the disk, which increases lubricant pick-up; mid disk (MD) fly height hump; low air bearing stiffness and altitude loss. Lubricant pickup occurs when lubricant collects on the head slider. Once collected on the head slider, the lubricant increases the fly-height and results in excessive magnetic spacing between the head slider and the disk. Further, the high peak pressure associated with air pressure between the head slider and the disk contributes to lubricant pickup. MD hump problems are associated with the head slider flying higher at middle locations of the disk where the skew angle of the head slider is close to zero, as opposed to the fly heights at the inner diameter (ID) and outer diameter (OD) of the disk. Manufacturing variations exist from part to part. Insufficient air bearing stiffness increases the sensitivity of the distance between the read/write head and the disk due to these variations. Altitude loss occurs when the head slider operates in places of reduced ambient air pressure such as altitudes above sea level. When the ambient pressure reduces, there is a loss in distance between the read/write head and the disk.

Embodiments of the invention may mitigate the above problems by providing an ABS surface of the head slider that has features that are asymmetrical with respect to a center line of the head slider. These features include arms that have extended linear portions that are substantially parallel to the direction of the airflow caused by the rotating magnetic disk, in one or both of the inner diameter (ID) and outer diameter (OD) positions of the head slider with respect to the magnetic disk. While not intending to be bound by theory, it is believed that by providing features that extend in the direction of the airflow, superior fly height stability is achieved. In one embodiment, the ABS includes a trailing pad adjacent a trailing edge of the head slider. First and second arms extend from the trailing pad toward a leading edge of the head slider and both include at least one extended linear portion. According to one embodiment of the invention, the extended linear portions are substantially parallel to the airflow from the magnetic disk, when the head slider is in the ID position. A channel is formed between the extended linear portions and also extends substantially parallel to the airflow from the magnetic disk, when the head slider is in the ID position. According to other embodiments of the invention, the second arm includes a further extended linear portion that is substantially parallel to the airflow from the magnetic disk, when the head slider is in the OD position.

FIG. 1 shows one embodiment of a magnetic hard disk drive 10 that includes a housing 12 within which a magnetic disk 14 is fixed to a spindle motor (SPM) by a clamp. The SPM drives the magnetic disk 14 to spin at a certain speed. A head slider 18 accesses a recording area of the magnetic disk 14. The head slider 18 has a head element section and a slider to which the head element section is fixed. The head slider 18 is provided with a fly-height control which adjusts the flying height of the head above the magnetic disk 14. An actuator 16 carries the head slider 18. In FIG. 1, the actuator 16 is pivotally held by a pivot shaft, and is pivoted around the pivot shaft by the drive force of a voice coil motor (VCM) 17 as a drive mechanism. The actuator 16 is pivoted in a radial direction of the magnetic disk 14 to move the head slider 18 to a desired position. Due to the viscosity of air between the spinning magnetic disk 14 and the head slider's air bearing surface (ABS) facing the magnetic disk 14, a pressure acts on the head slider 18. The head slider 18 flies low above the magnetic disk 14 as a result of this pressure balancing between the air and the force applied by the actuator 16 toward the magnetic disk 14. In some embodiments, the head slider 18 may have raised areas or portions (such as pads) that actually contact disk 14, as opposed to the slider head "flying" over the disk 14. In some embodiments, the disk drive 10 may include a ramp 19, where the head slider 18 is parked when the disk drive 10 is not in operation and disk 14 is not rotating.

Figure 2:
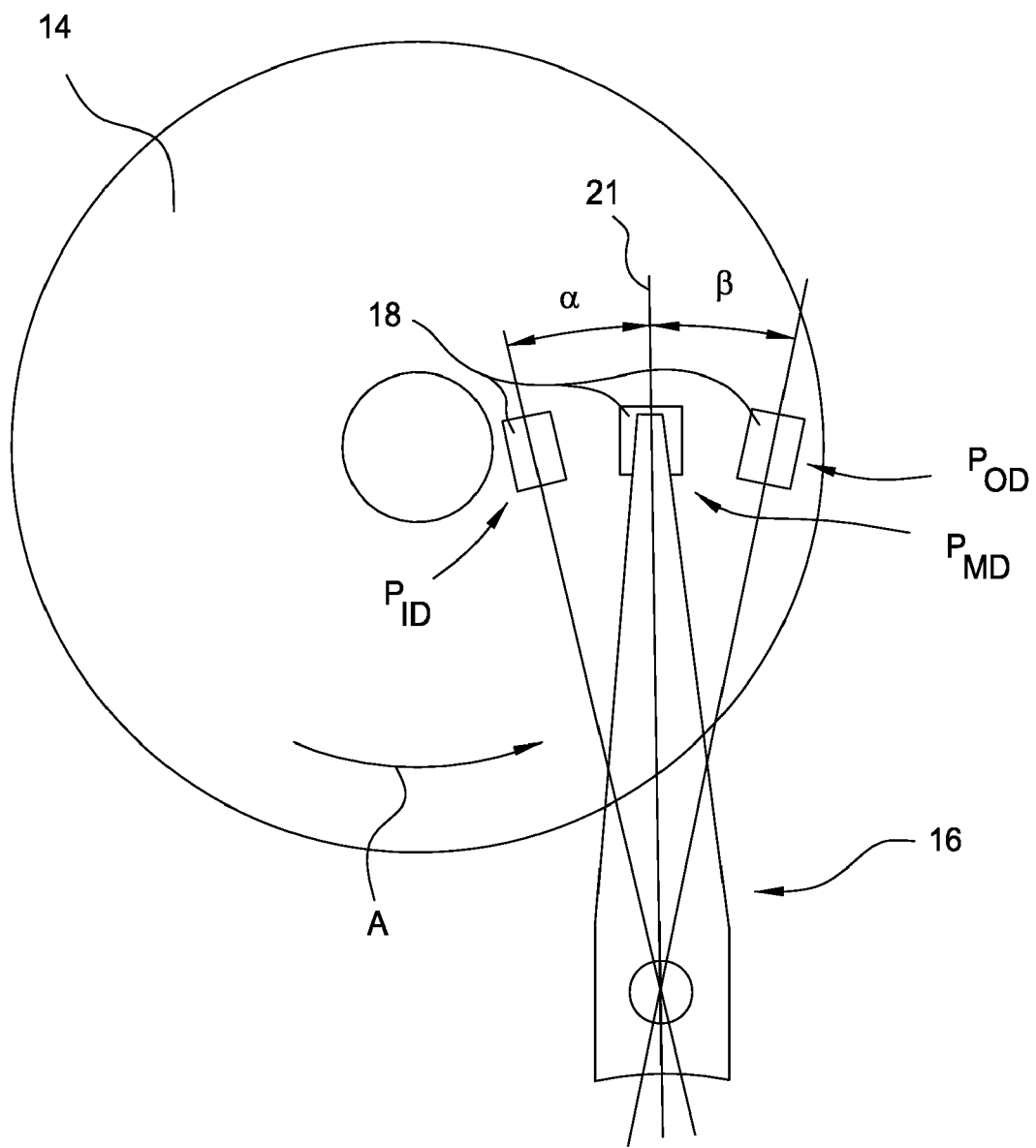
FIG. 2 is a diagram showing skew angles of the head slider at different positions with respect to the magnetic disk.

FIG. 2 is a diagram showing skew angles of the head slider 18 at different positions with respect to the magnetic disk 14. Actuator arm 16 supports the head slider 18 above the surface of the magnetic disk 14 at locations including an inner diameter (ID) position $P_{ID}$, an outer diameter (OD) position $P_{OD}$ and positions between $P_{ID}$ and $P_{OD}$. As the disk 14 spins, it produces airflow in a direction tangential to the disk in the direction the disk spins, as shown by arrow A. When the head slider 18 is at the mid-disk position $P_{MD}$, the centerline 21 of the head slider 18 is approximately aligned with the direction of the airflow produced by the disk 14, and the skew angle is therefore 0 (zero). When the head slider 18 is at other positions over the disk, however, the centerline 21 of the head slider 18 is not aligned with the direction of the airflow produced by the disk 14, and the angle of misalignment is known as the skew angle. As shown in FIG. 2, when the head slider is at the ID position $P_{ID}$, the skew angle is α, which is the maximum skew angle in the ID direction, and when the head slider is at the OD position $P_{OD}$, the skew angle is β, which is the maximum skew angle in the OD direction. The skew angle affects the flying characteristics of the head slider ABS. Generally, the greater the skew angle, the lower the lift produced for a given airflow velocity. In addition, the airflow velocity produced by the spinning disk 14 is dependent on the distance from the center of the disk. At head slider fly heights, the tangential airflow produced by the disk is very close to the tangential velocity of the disk. This tangential velocity is equal to (RPM)×2πR, where RPM is the rotations per minute of the disk, and R is the distance from the head slider location to the center of the disk. In general these effects combine to produce a fly height profile wherein the head slider tends to fly higher at the mid-disk position PMD and decreases in both directions to minimum values at the ID position $P_{ID}$ and the OD position $P_{OD}$. This phenomenon is known as mid disk (MD) hump as described above.

Figure 3:
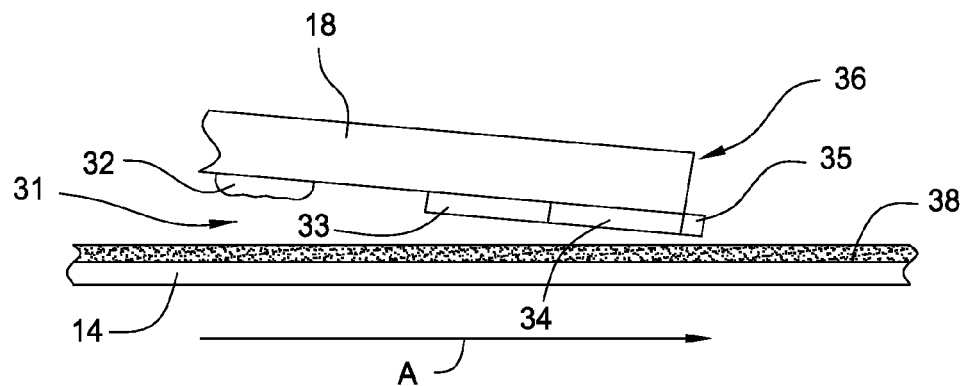
FIG. 3 is a side view of the head slider and magnetic disk of the disk drive of FIG. 1, according to embodiments of the invention.

FIG. 3 is a side view of the head slider 18 and the magnetic disk 14 of FIG. 1. Magnetic disk 14 is moving in the direction of arrow A, (as also shown in FIG. 2), and causes airflow in the same direction. This airflow flows over the air bearing surface (ABS) 31 of the head slider 18 and produces the lifting pressure described above. In one embodiment, head slider 18 includes raised areas such as front pad 32, side pads 33 and trailing pad 34. Trailing pad 34, located adjacent to and centered relative to, the trailing edge 36 of the head slider 18, may further include the read/write head 35 that writes and reads data to and from magnetic disk 14. Disk 14 has a lubricant 38 on its upper surface to protect the disk 14 from contact with the head slider 18.

Figure 4:
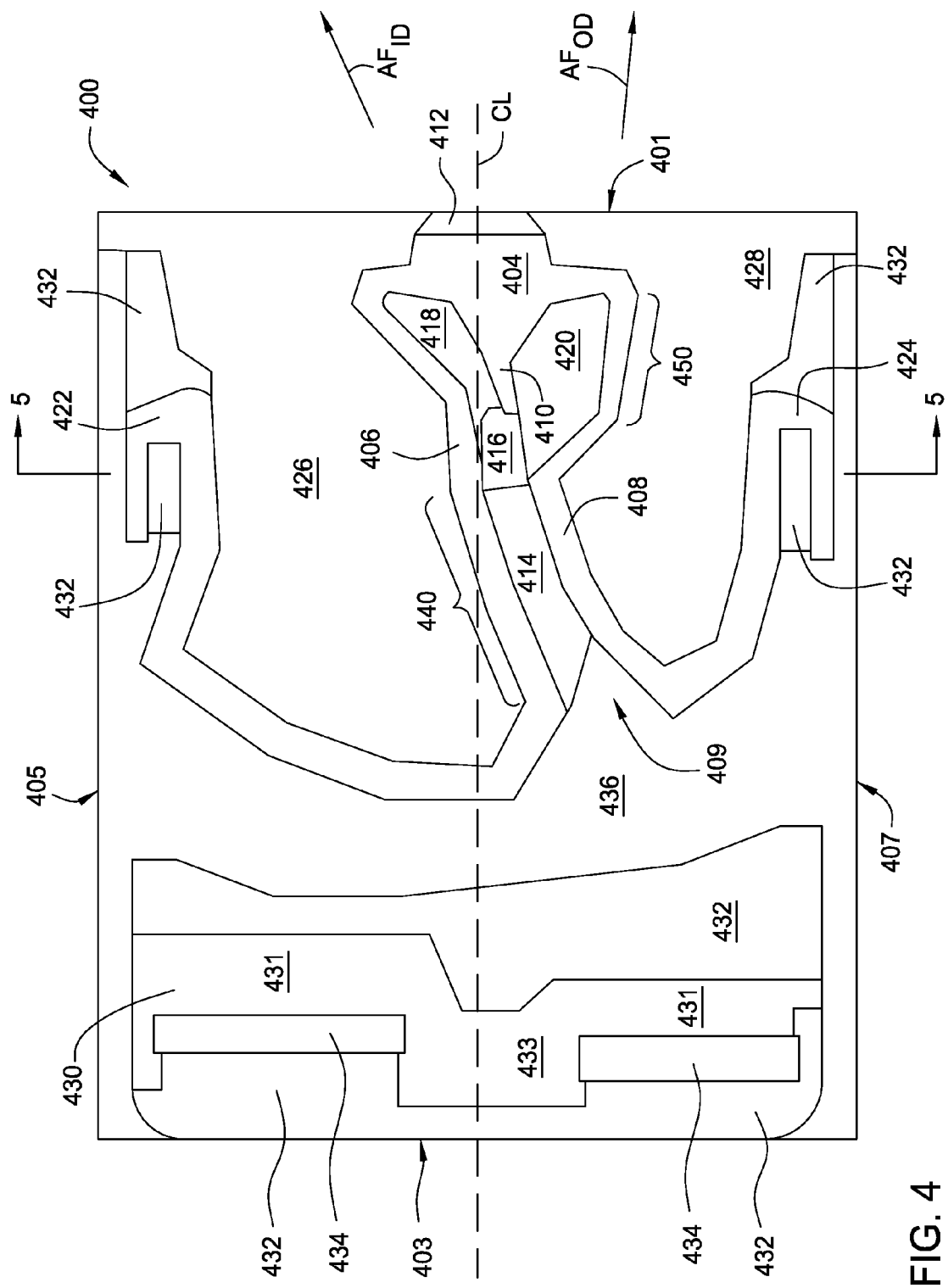
FIG. 4 is a plan view of the bottom of one embodiment of the head slider of FIGS. 1 and 2, showing the air bearing surface (ABS) of the head slider.

FIG. 4 is a plan view of an embodiment of the head slider 400 of the invention, showing the ABS side of the head slider. In one embodiment, head slider 400 is the head slider 18 of FIGS. 1-3, and the ABS of head slider 400 is the ABS 31 of head slider 18 which faces magnetic disk 14 in FIG. 3. In general, the ABS is formed on the bottom surface (the side facing the magnetic disk) of the head slider 400. The head slider 400 includes a leading edge 403, a trailing edge 401 and first 405 and second 407 side edges. The ABS includes a number of pads and connecting arms that are the highest (closest to the magnetic disk) features on the ABS. These features include a trailing pad 404 adjacent to the trailing edge 401 of the head slider 400, and generally symmetrically disposed about the center line CL of the ABS. According to some embodiments, trailing pad 404 includes a read/write head 412 adjacent to the trailing edge 401 of the head slider 400. First 406 and second 408 arms extend from the trailing pad 404 toward the leading edge 403 of the head slider 400. A longitudinal channel 409 has sides that are formed by portion 440 of the first 406 and second 408 arms. Also in this embodiment, the ABS includes first 422 and second 424 side pads adjacent to the first 405 and second 407 side edges of the head slider 400, respectively. In some embodiments, as shown, the side pads 422 and 424 have a substantially "U" shaped configuration, with the open part of the U facing the leading edge 403 of the head slider 400. Also in some embodiments, the first 406 and second 408 arms include a first end connected to the trailing pad 404. The portion of the arms 406 and 408 closest to the trailing pad 404, extend towards the leading edge 403 of the head slider 400 as described above. As the arms 406 and 408 extend further from the trailing pad 404 they form an arc toward the side edges 405 and 407 of the head slider. The first 406 and second 408 arms, both have a distal end that connects to the inner top portion of the U-shaped side pads 422 and 424, respectively. Also, in some embodiments the trailing pad may further include a third arm 410 between the first 406 and second 408 arms, thereby forming an ω shaped trailing pad. In addition to the side and trailing pads, the ABS may further include a leading pad 430 adjacent to the leading edge 403 of the head slider 400. The leading pad 430 includes two side portions 431 that are connected by a bridge portion 433. The bridge portion 433 is closer to the leading edge 403 of the head slider than the side portions 431.

In some embodiments the ABS also includes features at heights below the pads and arms described above. Some of these features are at a first etch level and include regions 418, 420 and 432. Region 418 is between the third arm 410 and the first arm 406, adjacent to the trailing pad 404. Region 420 is between the third arm 410 and the second arm 408, adjacent to the trailing pad 404. Regions 432 are: inside the U-shaped side pads 422 and 423; between the side pads 422 and 423 and the trailing edge 401, adjacent to side pads 422 and 423; and in front (toward the leading edge 403) and behind (toward the trailing edge 401), and adjacent to the leading pad 430. Other features are at a second etch level and include regions 414, 426 and 428. Region 414 is in the longitudinal channel 409 between the first 406 and second 408 arms. Region 426 is between the first arm 406 and the trailing edge 401, while region 428 is between the second arm 408 and the trailing edge 401. In this embodiment, some features are at a third, lowest etch level. These features include regions 416, 434 and 436. Region 416 is in the longitudinal channel 409 between the first 406 and second 408 arms and between region 414 and the third arm 410. Regions 434 are in front of and adjacent to the leading pad 430, behind regions 432. Region 436 extends from between arms 406 and 408 and region 432 behind leading pad 430, between the side pads 422 and 424 and the side edges 405 and 407, and between the two side portions 431 of the leading pad 430 and the side edges 405 and 407. All of these features are further described below, with respect to the methods for forming the ABS.

As can be seen in FIG. 4, the arms 406, 408 and 410, and other features of the ABS are asymmetrical with respect to a centerline CL of the ABS and the head slider 400. While all of the second arm 408 is on one side of the centerline CL, first arm 406 is curved such that part of first arm 406 is on the same side of the centerline CL as the second arm 408, while most of the first arm 406 is on the other side of the centerline CL as the second arm 408. Most of portion 440 of the first 406 and second 408 arms, as well as most of the longitudinal channel 409 formed therebetween, are on the same side of the centerline CL as the second arm 408. The third arm 410 includes a first end that is connected to the trailing pad 404, and a distal end that is located on the same side of the centerline CL as the second arm 408.

The asymmetrical shape of the ABS, includes features having extended linear portions that are substantially parallel to the airflow direction when the head slider is at one of the ID or OD positions. In one embodiment, for example, an extended linear portion 450 of the second arm 408 is substantially parallel to the airflow direction when the head slider 400 is at the outer diameter position (see FIG. 2). This airflow direction is indicated by arrow $AF_{OD}$ in FIG. 4. Also, according to some embodiments, an extended linear portion 440 of the first arm 406, the second arm 408 and channel 409 formed therebetween, is substantially parallel to the airflow direction when the head slider 400 is at the inner diameter position (see FIG. 2). This airflow direction is indicated by arrow $AF_{ID}$ in FIG. 4. In some embodiments, the dimensions of the head slider 400 is about 850 μm from the leading edge 403 to the trailing edge 401 and about 700 μm from the side edge 405 to the side edge 407. In one embodiment, the extended linear portion 450 of the second arm 408 is between 1 μm and 400 μm in length. In another embodiment, the extended linear portion 450 of the second arm 408 is between 40 μm and 300 μm in length. In a further embodiment, the extended linear portion 450 of the second arm 408 is between 80 μm and 200 μm in length. In one embodiment, the extended linear portion 440 of the first arm 406, the second arm 408 and channel 409 is between 1 μm and 400 μm in length. In another embodiment, the extended linear portion 440 of the first arm 406, the second arm 408 and channel 409 is between 40 μm and 300 μm in length. In a further embodiment, the extended linear portion 440 of the first arm 406, the second arm 408 and channel 409 is between 80 μm and 200 μm in length. As previously described, by providing an ABS having extended linear portions that are substantially parallel to the airflow at the ID and OD positions, fly height variations of the head slider 400 can be reduced or mitigated.

In one embodiment, the head slider is produced with only a two step etch process, as opposed to three step etch processes. By reducing the number of etching steps, the head slider can be produced at relatively lower costs and in less time, as one less mask and etch process is required. While a two etch step process may be used to produce the head slider, three etch depths can be produced by the process. This is accomplished by two selective etch processes. By selective etch process, it is meant that only a portion of the head slider ABS is etched. In one embodiment, this is done by using a mask to cover those portions that are not desired to be etched.

In the first step, a selective etch process creates regions at a first etch depth relative to the non-etched regions. In the second step, a second selective etch process creates regions at a second etch depth relative to the non-etched regions. In addition to second etch depth regions, the second selective etch process is also applied to portions of the first etch depth regions, as determined by the masks used for the etch processes. In this manner, features are formed that are at the first etch depth, a second etch depth and a third etch depth that is equal to the first etch depth plus the second etch depth. The resulting ABS includes features at four different levels: the three etch depths plus the non-etched (and therefore highest) level of the ABS.

One embodiment of a method for forming the ABS of the head slider 400 is described below with respect to FIG. 4. In this embodiment, the method of forming the ABS includes providing a head slider 400 having a leading edge 403, a trailing edge 401 and first 405 and second 407 side edges. A first selective etch process is conducted on the head slider 400 to form first and intermediate features at a first etch depth. The term "intermediate features" is used in the context of this application to indicate those features that will subsequently be subjected to a second etch process and therefore are temporary surfaces on the ABS during formation thereof. One particular embodiment of the first selective etch process involves placing a mask over those portions of the ABS, that are not to be etched by the first etch process. In the embodiment of FIG. 4, the first mask would cover the following features: all of the pads 404, 422, 424, 430 and arms 406, 408 and 410; and regions 414, 426 and 428. Thus in the embodiment of FIG. 4, regions 416, 418, 420, 432 (in front of and behind leading edge 430 and side pads 422 and 424), 434 and 436 are etched by the first selective etch process.

Again with respect to the embodiment of FIG. 4, a second selective etch process is conducted on the head slider 400. The second selective etch process forms second features at a second etch level, and also forms third features at a third etch level by subjecting the intermediate features formed by the first selective etch process to the second selective etch process as well. One particular embodiment of the second selective etch process involves placing a mask over those portions of the ABS, that are not to be etched by the second selective etch process. In the embodiment of FIG. 4, the second mask would cover the following features: all of the pads 404, 418, 420, 422, 424, 430 and arms 406, 408 and 410; and regions 432 (in front of and behind leading edge 430 and side pads 422 and 424). Thus in the embodiment of FIG. 4, regions 414, 416, 426, 428, 434 and 436 are etched by the second selective etch process. After the second selective etch process, the features of the ABS are as shown in FIG. 4.

The two step etch process as described above results in ABS features at four different levels (heights). The first, or highest level includes those features not etched by either process, namely the pads 404, 422, 424, 430 and arms 406 and 408. The second highest level includes those features etched only by the first selective etch process, namely regions 418, 420 and 432. Regions 418, 420 and 432 are etched to a first etch level from about 80 nm to about 300 nm below the surface of the pads 404, 422, 424, 430 and arms 406 and 408. The third highest level includes those features etched only by the second selective etch process, namely regions 414, 426 and 428. Regions 414, 426 and 428 are etched to a second etch level from about 1000 nm to about 2500 nm below the surface of the pads 404, 422, 424, 430 and arms 406 and 408. The lowest level includes those features etched by both the first and the second selective etch processes, namely regions 416, 434 and 436. Regions 416, 434 and 436 are etched to a third etch level that is the sum of both etch processes or from about 1080 nm to about 2800 nm below the surface of the pads 404, 422, 424, 430 and arms 406 and 408. Thus the methods of the invention produce an ABS with features at four levels using only two etch processes, as opposed to three etch processes. This results in a head slider that is produced in a more time and cost efficient manner.

Figure 5:
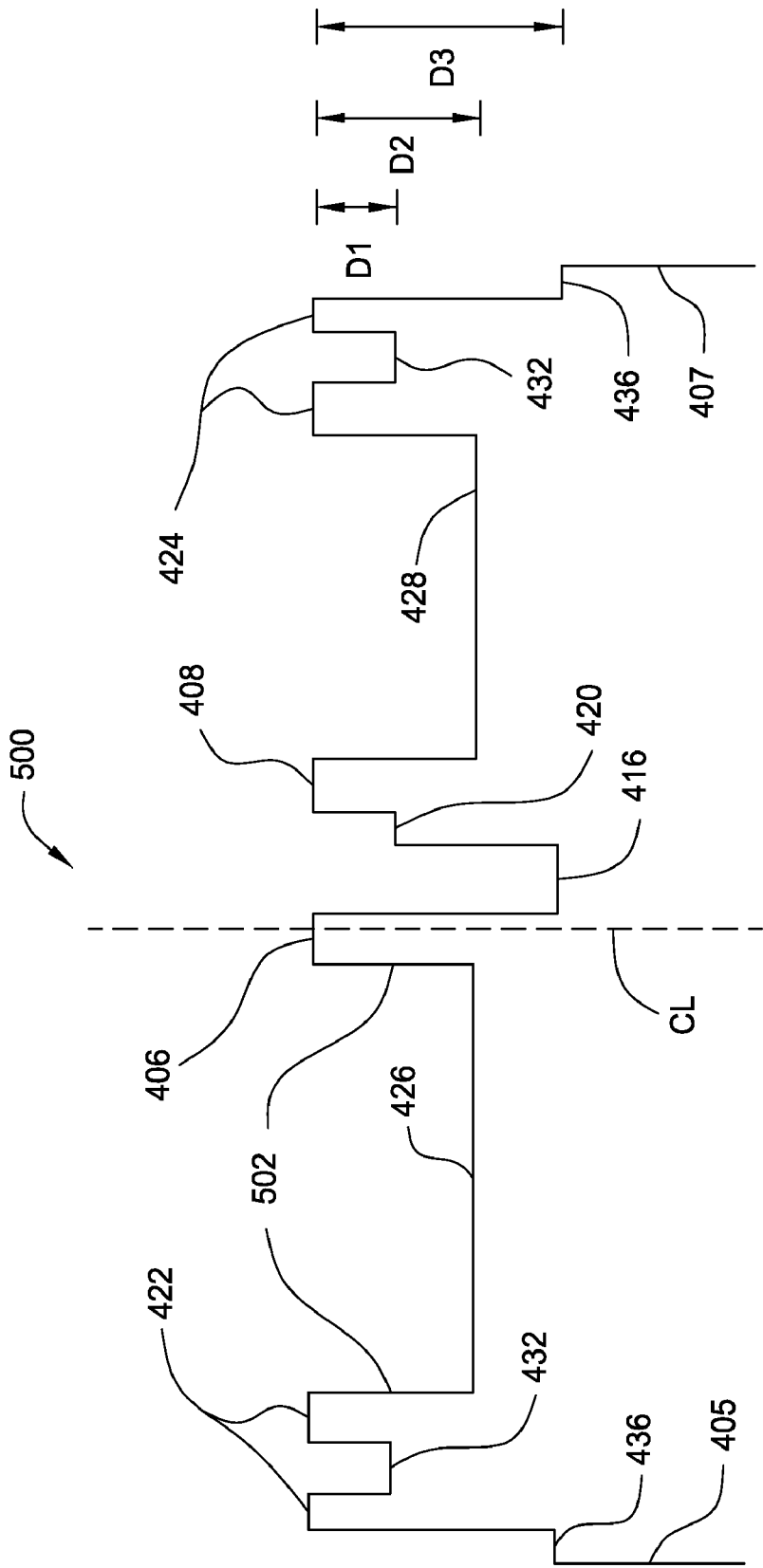
FIG. 5 is a cross section taken through section line 5-5 of FIG. 4.

FIG. 5 is a cross section of head slider 400 taken through section line 5-5 of FIG. 4, and showing relative heights of the features on the ABS 500 of head slider 400. The top surfaces of side pads 422 and 424 and arms 406 and 408 are at the highest level of the ABS 500. Regions 432 inside the U-shaped side pads 422 and 424 (see FIG. 4) are at the first etch level D1. Region 420 in the area between arms 406 and 408 is also at the first etch level D1. Region 426 between side pad 422 and arm 406, as well as region 428 between side pad 424 and arm 408, are at the second etch level D2. Region 416 in the area between arms 406 and 408, and regions 436 between the side pads 422 and 424 and the side edges 405 and 407, are at the third etch level D3. As previously described, the third etch level is formed by a combination of the first and second etch processes, such that D3=D1+D2. While the side surfaces (for example 502) are shown as vertical in FIG. 5, these side surfaces may be slanted, tapered or undulating, in some embodiments of the invention.

Figure 6:
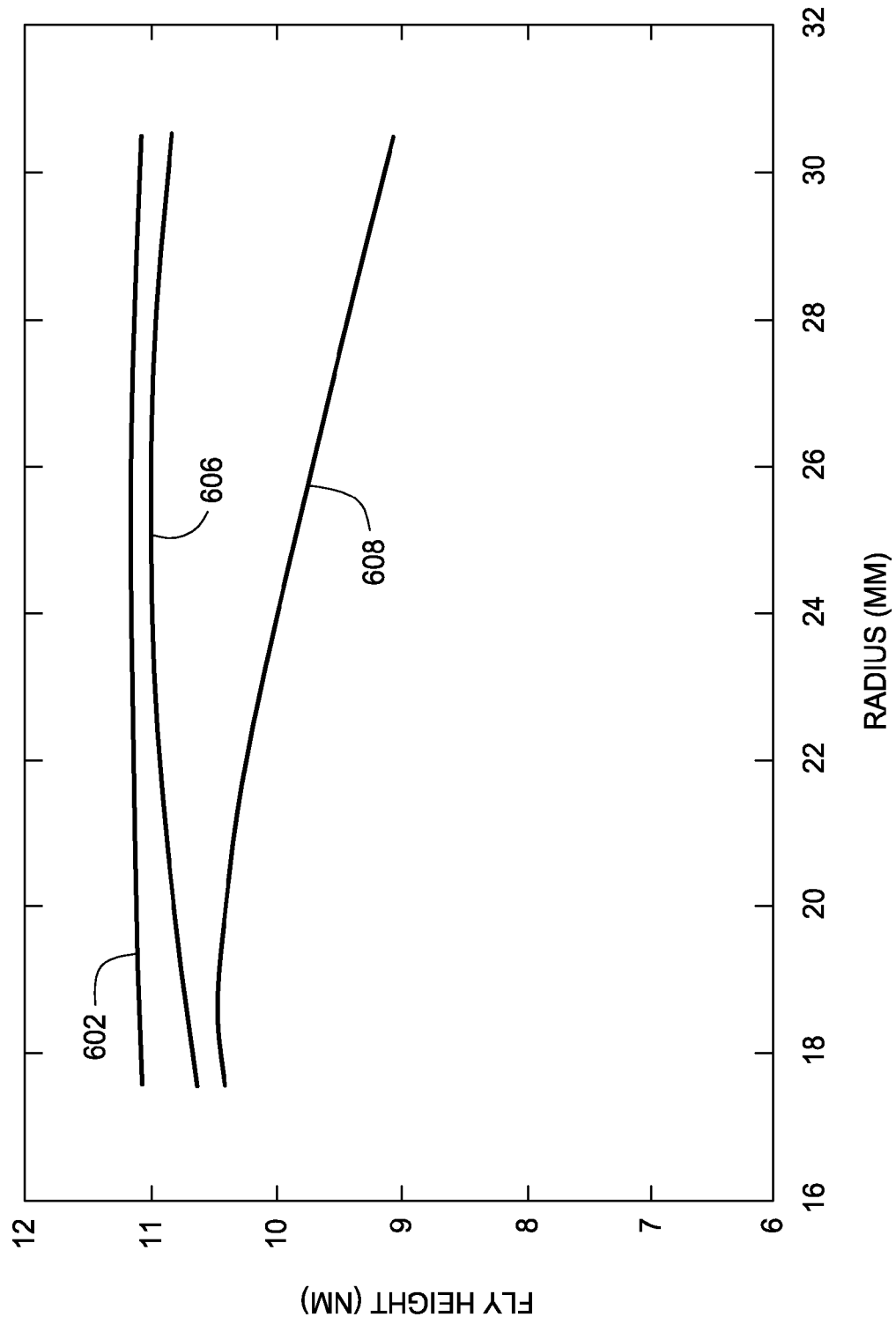
FIG. 6 is a fly height profile showing the fly height of the head slider over the magnetic disk for different positions of the head slider relative to the magnetic disk.

FIG. 6 is a fly height profile showing the fly height (left hand scale in nm) of one embodiment of a head slider of the invention, over a magnetic disk, for different radial positions (bottom scale in mm). Curve 602 shows the fly heights for a disk rotational speed of 10,000 RPM at an ambient air pressure equivalent to sea level (one atmosphere). Curve 606 shows the fly heights for a disk rotational speed of 10,000 RPM at an ambient air pressure equivalent to an altitude of 10,000 ft above sea level (0.7 atmosphere). Curve 608 shows the fly heights for a disk rotational speed of 4,800 RPM (servo write speed) at an ambient air pressure equivalent to sea level (one atmosphere). Curve 602 illustrates that at standard speeds and atmosphere, the head slider of the invention has a small MD hump on the order of 0.3 nm.

While the foregoing is directed to embodiments of the present invention, other and further embodiments of the invention may be devised without departing from the basic scope thereof, and the scope thereof is determined by the claims that follow.

What is claimed is:

1. A head slider for a hard disk drive, the head slider comprising:
 a leading edge;
 a trailing edge;
 first and second side edges extending between the leading edge and the trailing edge; and
 an air bearing surface (ABS), comprising:
  a trailing pad adjacent the trailing edge of the head slider;
  a first arm having a first end connected to the trailing pad, the first arm extending from the trailing pad toward the leading edge of the head slider and including a first extended linear portion oriented substantially parallel to an airflow direction when the head slider is positioned at an inner diameter (ID) position relative to a spinning magnetic disk; and
  a second arm having a first end connected to the trailing pad, the second arm extending from the trailing pad toward the leading edge of the head slider and including a second extended linear portion oriented substantially parallel to an airflow direction when the head slider is positioned at an outer diameter (OD) position relative to the spinning magnetic disk; wherein:
the entire second extended linear portion and at least part of the first extended linear portion are located on a same side of a center line of the ABS.

2. The head slider of claim 1 wherein:
the second arm includes a third extended linear portion;
the first extended linear portion of the first arm and the third extended linear portion of the second arm form a channel therebetween; and
the first and third extended linear portions and the channel are all substantially parallel to the airflow direction when the head slider is positioned at the ID position.

3. The head slider of claim 2 wherein most of the first and third extended linear portions and the channel are on the same side of the center line of the ABS as the second extended linear portion.

4. The head slider of claim 1 wherein:
the ABS further comprises first and second side pads adjacent to the first and second side edges of the slider, respectively;
the first arm has a distal end connected to the first side pad; and
the second arm has a distal end connected to the second side pad.

5. The head slider of claim 1 wherein the trailing pad is located at the center line of the ABS.

6. The head slider of claim 1 wherein the ABS further comprises a third arm between the first and second arm, the third arm having a first end connected to the trailing pad.

7. The head slider of claim 6 wherein the third arm has a distal end, the distal end of the third arm being located on the same side of the center line of the ABS as the second extended linear portion.

8. A hard disk drive, the hard disk drive comprising:
a magnetic disk with a surface, the magnetic disc creating an airflow in a direction substantially tangential to the magnetic disk, when the disk is spinning, and
an actuator arm designed and configured to support a head slider over the disk surface at an inner diameter (ID) position, an outer diameter (OD) position and positions in between the ID and OD positions, the head slider comprising:
a leading edge;
a trailing edge;
first and second side edges extending between the leading edge and the trailing edge; and
an air bearing surface (ABS), comprising:
a trailing pad adjacent the trailing edge of the head slider;
a first arm having a first end connected to the trailing pad, the first arm extending from the trailing pad toward the leading edge of the head slider and including a first extended linear portion oriented substantially parallel to an airflow direction when the head slider is positioned at an inner diameter (ID) position relative to a spinning magnetic disk; and
a second arm having a first end connected to the trailing pad, the second arm extending from the trailing pad toward the leading edge of the head slider and including a second extended linear portion oriented substantially parallel to an airflow direction when the head slider is positioned at an outer diameter (OD) position relative to the spinning magnetic disk; wherein:
the entire second extended linear portion and at least part of the first extended linear portion are located on a same side of a center line of the ABS.

9. The hard disk drive of claim 8 wherein:
the second arm includes a third extended linear portion;
the first extended linear portion of the first arm and the third extended linear portion of the second arm form a channel therebetween; and
the first and third extended linear portions and the channel are all substantially parallel to the airflow direction when the head slider is positioned at the ID position.

10. The hard disk drive of claim 9 wherein most of the first and third extended linear portions and the channel are on the same side of the center line of the ABS as the second extended linear portion.

11. The hard disk drive of claim 8 wherein:
the ABS further comprises first and second side pads adjacent to the first and second side edges of the slider, respectively;
the first arm has a distal end connected to the first side pad; and
the second arm has a distal end connected to the second side pad.

12. The hard disk drive of claim 8 wherein the trailing pad is located at the center line of the ABS.

13. The hard disk drive of claim 8 wherein the ABS further comprises a third arm between the first and second arm, the third arm having a first end connected to the trailing pad.

14. The hard disk drive of claim 13 wherein the third arm has a distal end, the distal end of the third arm being located on the same side of the center line of the ABS as the second extended linear portion.

15. A method of forming an air bearing surface (ABS) of a head slider for use in a hard disk drive, the method comprising:
providing a head slider having a leading edge, a trailing edge and first and second side edges;
conducting a first selective etch process on the head slider to form first and intermediate features at a first etch depth; and
conducting a second selective etch process on the head slider to form second features at a second etch depth, and to form third features at a third etch depth by subjecting the intermediate features formed by the first selective etch process to the second selective etch process; the first and second selective etch processes forming:
a trailing pad adjacent the trailing edge of the head slider;
a first arm having a first end connected to the trailing pad, the first arm extending from the trailing pad toward the leading edge of the head slider and including a first extended linear portion oriented substantially parallel to an airflow direction when the head slider is positioned at an inner diameter (ID) position relative to a spinning magnetic disk; and
a second arm having a first end connected to the trailing pad, the second arm extending from the trailing pad toward the leading edge of the head slider and including a second extended linear portion oriented substantially parallel to an airflow direction when the head slider is positioned at an outer diameter (OD) position relative to the spinning magnetic disk; wherein:
the entire second extended linear portion and at least part of the first extended linear portion are located on a same side of a center line of the ABS.

16. The method of claim 15 wherein the first and second selective etch processes form the second arm such that it includes a third extended linear portion; wherein the first extended linear portion of the first arm and the third extended linear portion of the second arm form a channel therebetween; and the first and third extended linear portions and the channel are all substantially parallel to the airflow direction when the head slider is positioned at the ID position.

17. The method of claim 16 wherein most of the first and third extended linear portions and the channel are on the same side of the center line of the ABS as the second extended linear portion.

18. The method of claim 15 wherein:

the first and second selective etch processes further form first and second side pads adjacent to the first and second side edges of the head slider, respectively;

the first arm has a distal end connected to the first side pad; and the second arm has a distal end connected to the second side pad.

19. The method of claim 15 wherein all of the second arm is located on the same side of the center line of the ABS as the second extended linear portion.

20. The method of claim 15 wherein the first and second selective etch processes further form a third arm between the first and second arm, the third arm having a first end connected to the trailing pad.

21. The method of claim 20 wherein the third arm has a distal end, the distal end of the third arm being located on the same side of the center line of the ABS as the second extended linear portion.

* * * * *